(12) United States Patent
Lee et al.

(10) Patent No.: US 8,649,328 B2
(45) Date of Patent: Feb. 11, 2014

(54) SYSTEM AND METHOD FOR CONTROLLING A POWER LINE NETWORK

(75) Inventors: Max Meng-Yu Lee, Tainan (TW); Cheng-Hsiung Wang, Kaohsiung (TW); Chun-Yu Wang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 169 days.

(21) Appl. No.: 13/306,944

(22) Filed: Nov. 29, 2011

(65) Prior Publication Data
US 2013/0039219 A1   Feb. 14, 2013

(30) Foreign Application Priority Data
Aug. 8, 2011   (TW) .............................. 100128182 A

(51) Int. Cl.
*H04W 4/00*   (2009.01)
(52) U.S. Cl.
USPC .......................... 370/328; 370/255; 455/456.1
(58) Field of Classification Search
USPC ................. 370/328–339, 252–255, 400, 352; 455/456.1, 456.2
See application file for complete search history.

(56) References Cited

U.S. PATENT DOCUMENTS

| 7,720,471 B2 | 5/2010 | Ayyagari et al. |
| 7,729,282 B2 | 6/2010 | Lee et al. |
| 7,907,050 B1 | 3/2011 | Callaghan |
| 8,130,677 B2 * | 3/2012 | Barker et al. ................. 370/255 |
| 8,300,783 B2 * | 10/2012 | Hillis et al. ................ 379/93.21 |

OTHER PUBLICATIONS

Weilin Liu, et al., "Broadband PLC Access Systems and Field Deployment in European Power Line Networks", IEEE Communications Magazine, May 2003, p. 114-118.
Diogo Nunes De Oliveira, et al., "A Management System for PLC Networks Using SNMP Protocol", IEEE, 2010, p. 78-83.
Chang-Keun Park, et al., "Definition of Common PLC MIB and Design of MIB Mapper for Multi-vendor PLC Network Management", IEEE International Symposium on Power Line Communications and its Applications, 2008, p. 152-157.
Jae Ho Lee, et al., "A Study on the Advanced PLC System using the MIB and SNMP", International Conference on Control, Automation and Systems, p. 2363-2367, Oct. 17-20, 2007 in COEX, Seoul, Korea.

* cited by examiner

*Primary Examiner* — Ricky Ngo
*Assistant Examiner* — Iqbal Zaidi
(74) *Attorney, Agent, or Firm* — Jianq Chyun IP Office

(57) ABSTRACT

A system and a method for controlling a power line network are provided. In the system and the method, a control unit device in every control network generates its own control network identification (CNID) and sends query messages to the other control networks to ensure each CNID is unique in the signal-reachable networks. The system and the method differentiate messages of the local control network from messages of the other control networks based on received signal strength of the messages in order to correctly demarcate multiple control networks.

18 Claims, 4 Drawing Sheets

SYSTEM AND METHOD FOR CONTROLLING A POWER LINE NETWORK

CROSS-REFERENCE TO RELATED APPLICATION

This application claims the priority benefit of Taiwan application serial no. 100128182, filed on Aug. 8, 2011. The entirety of the above-mentioned patent application is hereby incorporated by reference herein and made a part of this specification.

BACKGROUND OF THE INVENTION

1. Field of the Invention

The disclosure relates to a system and a method for controlling a power line network.

2. Description of Related Art

Electric power is an essential resource in modern society. Power lines are used to transmit the electric power from power plants to each house through substations and outdoor transformers. Besides transmitting power, the power lines in houses and offices can be used to connect control unit devices and network devices. Therefore the power lines, control unit devices, and network devices together can construct a power line network, which is also referred to as a smart grid. Such power line network may use a power line communication (PLC) protocol to provide functions such as remote meter reading, advanced metering infrastructure (AMI), home appliance control, lighting control, and home automation, etc.

FIG. 1 is a schematic diagram of a conventional power line network 100. The power line network 100 has two control networks 120 and 140. Each control network corresponds to a living or working place of a group of people, for example, a family house, a company's office, a store or a factory building, etc. Each control network includes a control unit device and at least one network device, for example, the control network 120 includes a control unit device 122 and network devices 123-125, and the control network 140 includes a control unit device 142 and network devices 143-145. The control unit device is a primary controller of the corresponding control network, and the network devices can be power-consuming devices such as electric appliances or electric meters, etc. Each control network has a corresponding boundary point, the control network 120 corresponds to a boundary point 121, and the control network 140 corresponds to a boundary point 141. The boundary point is a device located between a control network and the external power line network, which is generally an electric switchboard, a no-fuse breaker (NFB) or an electric meter, etc. The range inside the boundary point belongs to the range of the control network. The network devices can not be attached or connected in the area between two boundary points, since normally no electric sockets for the network devices are disposed in the area.

Each control network has a control network identification (CNID). The control unit device and the network devices in a same control network have the same CNID. Since the power line of a densely populated city connects a plurality of houses in series, the control networks of many houses are connected to each other through the power line. The CNID of each control network has to be unique and not be duplicated in the boundary of the signal-reachable power line network.

The power line network has an issue of network demarcation. Since the control networks of the neighbours are all connected and signal-reachable, and if there is no precaution, appliances or lights are probably controlled by the neighbours, or the power company may mistake a digital meter reading of one household as a digital meter reading of another household.

SUMMARY OF THE INVENTION

Accordingly, the disclosure is directed to a system for controlling a power line network and a method for controlling a power line network, by which repetition of a control network identification is avoided, and a network demarcation is resolved.

The disclosure provides exemplary embodiments of a system for controlling a power line network, which includes a control unit device. The control unit device generates a first temporary identification (ID), and broadcasts a first query message in the power line network. The first query message includes the first temporary ID. When the control unit device does not receive a response/warning message corresponding to the first query message within a predetermined time, it sets a control network identification (CNID) of the control unit device to the first temporary ID. When the control unit device receives the response/warning message corresponding to the first query message within the predetermined time, the control unit device generates a second temporary ID, and broadcasts a second query message in the power line network. The second query message includes the second temporary ID, and the second temporary ID is different to the first temporary ID.

The disclosure provides exemplary embodiments of a system for controlling a power line network, which includes a control unit device and one or more network devices. The control unit device coordinates an agent device so that the agent device and the control unit device synchronously broadcast a plurality of discovery messages in the power line network. Each of the discovery messages includes a control network identification (CNID) of the device sending the discovery message. The one or more network devices receive all of the discovery messages from the power line network, and sets the CNID of the discovery message with the strongest received signal strength as a CNID of the one of more network devices.

The disclosure also provides exemplary embodiments of a system for controlling a power line network, which is a combination of the aforementioned two systems for controlling the power line networks.

The disclosure provides exemplary embodiments of a method for controlling a power line network. A first temporary identification (ID) is generated. A first query message is broadcasted in the power line network, where the first query message includes the first temporary ID. A control network identification (CNID) of a control unit device is set to the first temporary ID when a response/warning message corresponding to the first query message is not received within a predetermined time. A second temporary ID is generated when the response/warning message corresponding to the first query message is received within the predetermined time, and a second query message is broadcasted in the power line network. The second query message includes the second temporary ID, and the second temporary ID is different to the first temporary ID.

The disclosure provides exemplary embodiments of a method for controlling a power line network. A control unit device coordinates an agent device so that the agent device and the control unit device synchronously broadcast a plurality of discovery messages in the power line network, where each of the discovery messages includes a control network identification (CNID) of the device sending the discovery message. One or more network devices receive all of the discovery messages from the power line network, and sets the CNID of the discovery message with the strongest received signal strength as a CNID of the one or more network devices.

The disclosure also provides exemplary embodiments of a method for controlling a power line network, which is a combination of the aforementioned two methods for controlling the power line network.

Several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
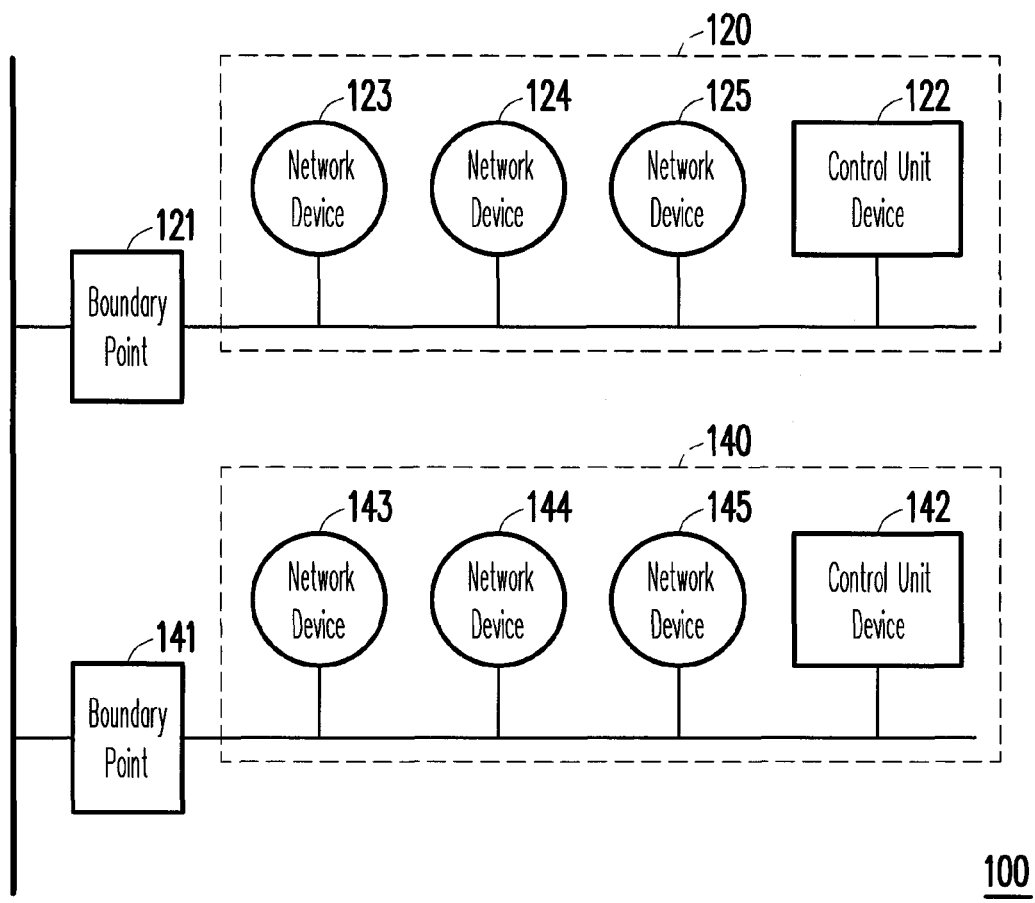
FIG. 1 is a schematic diagram of a conventional power line network 100.
Figure 2:
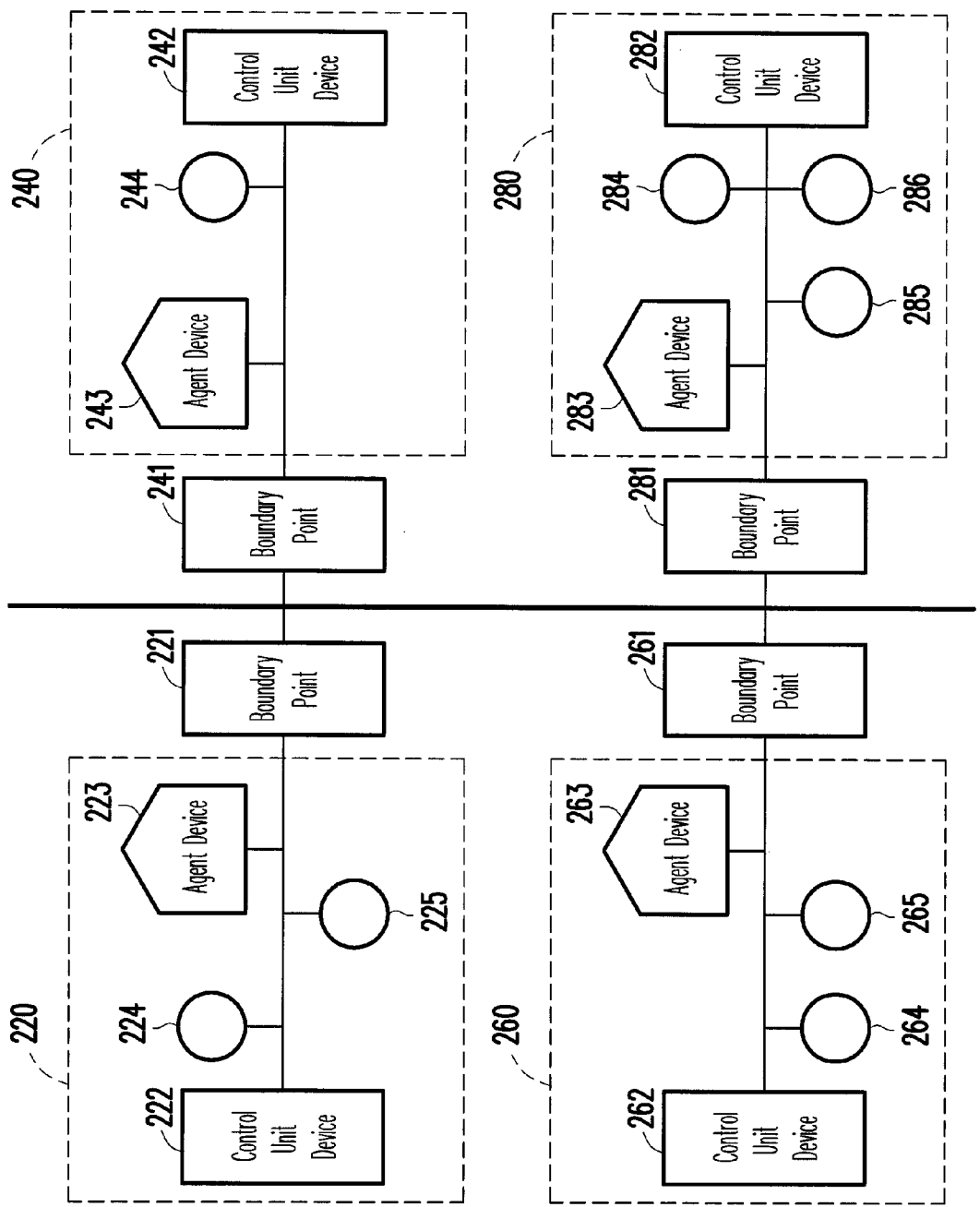
FIG. 2 is a schematic diagram of a system for controlling a power line network according to an exemplary embodiment of the disclosure.

FIG. 2 is a schematic diagram of a power line network 200 and a system for controlling the power line network according to an exemplary embodiment. The power line network 200 includes four boundary points 221, 241, 261, 281 and four control networks 220, 240, 260 and 280. The boundary point 221 corresponds to the control network 220, the boundary point 241 corresponds to the control network 240, the boundary point 261 corresponds to the control network 260, and the boundary point 281 corresponds to the control network 280. The control network 220 includes a control unit device 222, an agent device 223 and two network devices 224 and 225. The control network 240 includes a control unit device 242, an agent device 243 and a network device 244. The control network 260 includes a control unit device 262, an agent device 263 and two network devices 264 and 265. The control network 280 includes a control unit device 282, an agent device 283 and three network devices 284, 285 and 286. The system for controlling the power line network of the embodiment is composed of the control unit device, the agent device and the network devices of each control network.

Each of the control networks has an identification (ID), i.e. a control network identification (CNID). If a power line network includes a plurality of control networks, the CNIDs of the control networks have to be different to each other without duplicating. The CNID of each control network is shared by the control unit device, the agent device and the network devices therein. Besides the CNID, each of the control unit devices, the agent devices and the network devices has a device ID used for distinguishing.

Figure 3:
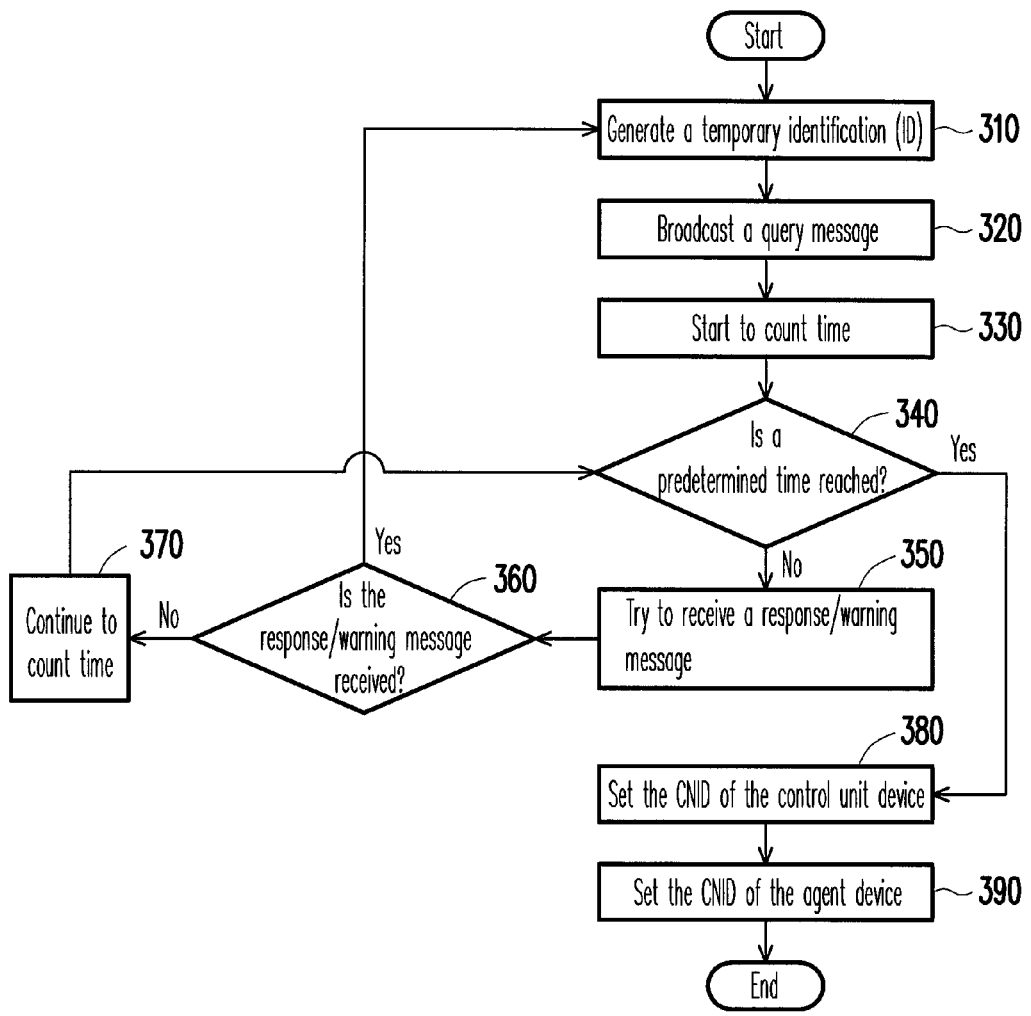
FIG. 3 and FIG. 4 are flowcharts illustrating a method for controlling a power line network according to an exemplary embodiment of the disclosure.

FIG. 3 is a flowchart illustrating a method for controlling a power line network according to an exemplary embodiment. If a new control network is added to the power line network 200, the control unit device of such control network can automatically generate a non-duplicated/non-conflicting CNID according to the flow of FIG. 3. Taking the control network 280 as an example, it is assumed that the control network 280 is newly added to the power line network 200, and the control network 280 still not have its own CNID.

First, the control unit device 282 generates a temporary ID (step 310). The control unit device 282 can generate the temporary ID of the step 310 according to its own device ID, a random number and a predetermined function. For example, the control unit device 282 generates the temporary ID of the step 310 by inputting the device ID and the random number into the predetermined function. Then, the control unit device 282 broadcasts a query message in the power line network 200 (step 320), where the query message includes the temporary ID. Then, the control unit device 282 starts counting time (step 330), and checks whether a counted time reaches a predetermined time (step 340). Since the time counting is just started, the predetermined time is not reached, and the flow enters a step 350.

Since the control networks are all connected, the control unit devices 222, 242 and 262 of the other control networks can all receive the query message sent by the control unit device 282. Each control unit device that receives the query message inspects whether the temporary ID included in the query message is the same as its own CNID. If yes, the control unit device sends a response/warning message corresponding to the query message to the power line network 200. If the control unit device 282 has generated a formal CNID, and receives a query message from other control networks, it performs the same processing procedure.

The control unit device 282 tries to receive the response/warning message corresponding to the aforementioned query message (step 350), and inspects whether the response/warning message is received (step 360). If the response/warning message is received within the predetermined time, it represents that the temporary ID is duplicated/conflicting to the CNIDs of the other control networks. In this case, the flow is returned back to the step 310, by which the control unit device 282 generates a next temporary ID according to its own device ID, a random number and a predetermined function. The generated temporary ID is different to the previous temporary ID. Then, the control unit device 282 broadcasts a query message containing the generated temporary ID in the power line network 200 to enter a next cycle.

Referring to the step 360, if the control unit device 282 does not receive any response/warning message, it continually counts time (step 370), and inspects whether the counted time reaches the predetermined time (step 340). If not, the control unit device 282 tries to receive the response/warning message (step 350). If the counted time reaches the predetermined time, it represents that the control unit device 282 does not receive any response/warning message within the predetermined time, which means that the generated temporary ID is unique and is not duplicated to the other CNIDs. In this case, the control unit device 282 sets its own CNID to the temporary ID (step 380), and sets the CNID of the agent device 283 to the temporary ID (step 390).

In other words, the control unit device 282 generates a first temporary ID, and broadcasts a first query message in the power line network. The first query message includes the first temporary ID. If the control unit device 282 does not receive a response/warning message corresponding to the first query message within a predetermined time, it sets its own CNID to the first temporary ID. If the control unit device 282 receives the response/warning message corresponding to the first query message within the predetermined time, it generates a second temporary ID, and broadcasts a second query message in the power line network. The second query message includes the second temporary ID, and the second temporary ID is different to the first temporary ID.

The control unit device and the agent device of the newly added control network can obtain a CNID according to the method flow of FIG. 3. Regarding the network device of such control network, it can obtain the CNID from discovery messages broadcasted by the control unit device and the agent device, which is described later.

In the embodiment, a function of the agent device is to assist the control unit device to broadcast the aforementioned discovery messages. In each of the control networks, the control unit device coordinates the agent device of the same control network so that the agent device and the control unit device synchronously broadcast discovery messages in the power line network 200. During each broadcasting, the control unit device and the agent device respectively broadcast a discovery message, where each of the discovery message includes a CNID of the device (i.e. the control unit device or the agent device) sending the discovery message.

The aforementioned synchronous broadcasting can be performed according to a predetermined cycle, namely, the control unit device of each control network coordinates the agent device of the same control network according to the predetermined cycle so that the agent device and the control unit device synchronously broadcast the aforementioned discovery messages in the power line network 200. Since each of the control networks has such synchronous broadcasting, each of the network devices in the power line network 200 consecutively receives the discovery messages sent by the control unit devices and the agent devices of the control networks.

The aforementioned synchronous broadcasting can also be triggered by a newly added network device. For example, when a network device is connected to the control network for the first time, or just recovered from an abnormal state such as an error or malfunction, etc., to reconnect with the control network, the network device sends a request message of the CNID to the power line network 200. Each of the control unit devices in the power line network 200 may receive the aforementioned request message, and coordinates the agent device of the same control network in response to the request message so that the agent device and the control unit device synchronously broadcast the discovery messages in the power line network 200. Therefore, each of the network devices in the power line network 200 can quickly receives the discovery messages sent by the control unit devices and the agent devices of the control networks.

Figure 4:
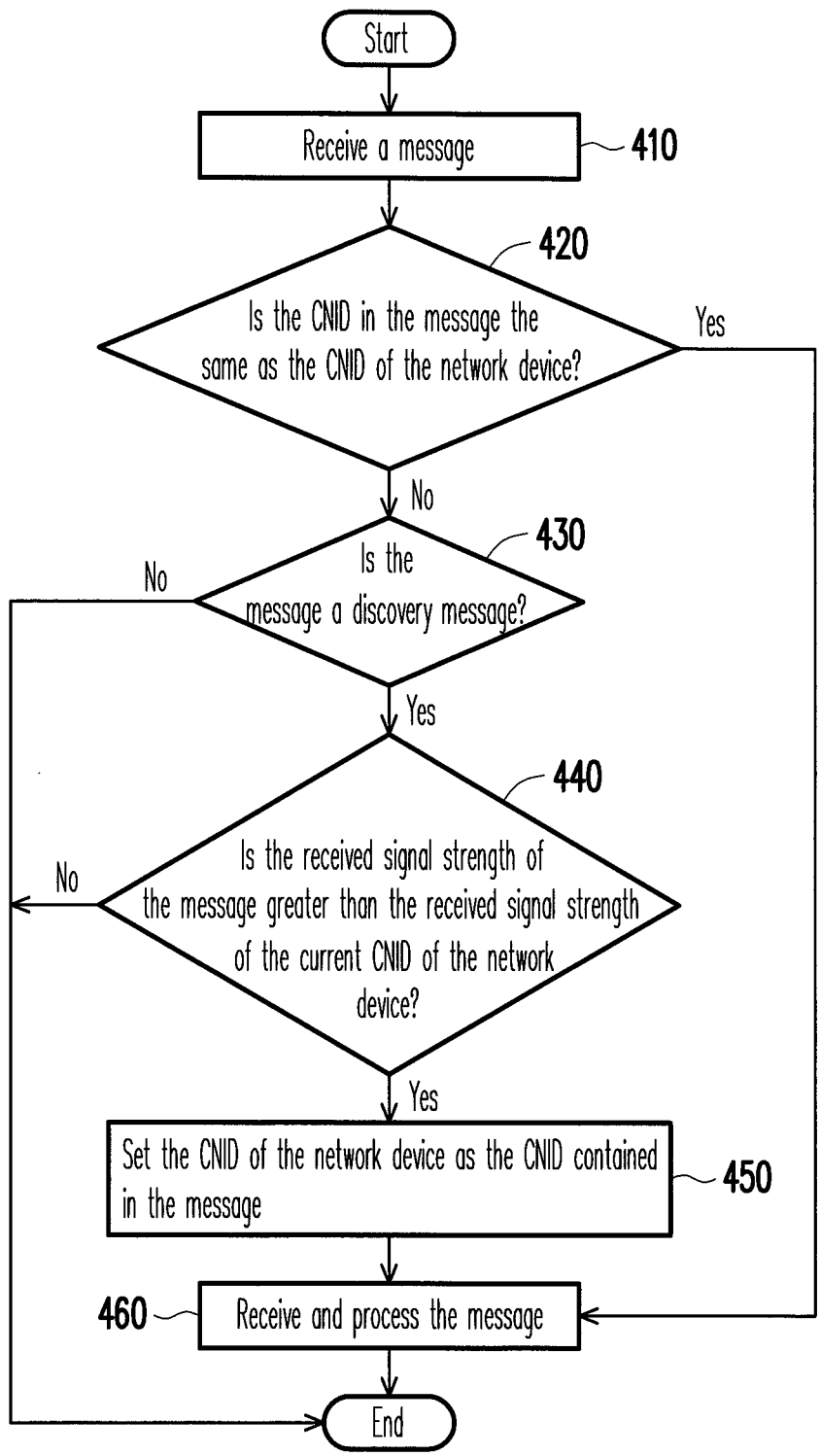

FIG. 4 is a flowchart illustrating a method for controlling a power line network according to an exemplary embodiment. Each of the network devices in the power line network 200 can process all messages (including the aforementioned discovery messages) received from the power line network 200 according to the method flow of FIG. 4. The network device 265 of the control network 260 is taken as an example to describe the method flow of FIG. 4.

First, the network device 265 receives a message from the power line network 200 (step 410), and inspects whether the CNID contained in the message is equal to its own CNID (step 420). If yes, a step 460 is executed, by which the network device 265 receives and processes such message, for example, if the network device 265 receives a control message from the control unit device 262 in the step 460, the network device 265 executes a control operation required by the control unit device 262. If the two CNIDs are different according to the step 420, it is inspected whether the message is the aforementioned discovery message (step 430). If not, the flow is ended. If yes, the network device 265 inspects whether the received signal strength of the message is greater than the received signal strength of the current CNID of the network device 265 (step 440). If not, the flow is ended. If yes, the network device 265 sets its own CNID as the CNID contained in the message (step 450). According to the above flow, the network device 265 sets the CNID of the discovery message with the strongest received signal strength as the CNID of the network device 265. Then, the network device 265 receives and processes the message (step 460). If the network device 265 receives a discovery message from the control unit device 262 or the agent device 263 in the step 460, the network device 265 sends a response message to the power line network 200 in response to the discovery message, where the response message includes the device ID of the network device 265. The control unit device 262 receives the response message and records the device ID of the network device 265. According to the response messages of the network devices, the control unit device collects and records the device IDs of the network devices in the same control network. In this way, the control unit device can learn those network devices still a normal operating state, which avails controlling or managing the network devices in the same control network.

In the embodiment, all of the control unit device, the agent device and the network devices have to be located in the corresponding control network. The agent device has to be located at a place in the corresponding control network closest to the boundary point, and the control unit device or the network device cannot be disposed between the agent device and the corresponding boundary point, and the control unit device or the network device cannot be disposed between any two of the boundary points.

As shown in FIG. 2, according to such configuration, among the agent device, the control unit device and the network devices of each control network, the agent device is closest to the other control network. Taking the control network 220 as an example, a route from any one of the network devices 224 and 225 to any of the other control networks (i.e. the control networks 240, 260 or 280) is bound to pass through the agent device 223. Therefore, regarding each of the network devices, the distance along the power line between the agent device of the same control network and such network device is smaller than the distance along the power line between the control unit device or the agent device of any other control network and such network device. In a general power line network, a communication signal is gradually attenuated as a transmission distance increases. Namely, in the discovery messages received from the power line network 200 by any of the network devices, the discovery message with the strongest received signal strength is bound to come from the control unit device or the agent device of the same control network.

According to the flow of FIG. 4, the network device sets the CNID of the discovery message with the strongest received signal strength as its own CNID. In this way, it is ensured that the CNID of each network device is the same as the CNIDs of the control unit device and the agent device of the same control network. According to the method flow of FIG. 4, it is known that except the discovery messages, each of the network device only receives and processes messages having the same CNID as its own CNID, i.e. only receives and processes messages coming from the same control network. Therefore, the network device is only controlled by the control unit device of the same control network, which achieves a correct network demarcation.

The control unit device of the aforementioned embodiment can automatically generate a non-duplicated CNID according to a method. The network device of the aforementioned embodiment can determine whether a message comes from the same control network according to the received signal strength of the message, so as to avoid being controlled by the control unit devices of the other control networks to resolve the network demarcation. The control unit device of the aforementioned embodiment broadcasts the discovery message synchronously with the agent device, and collects and records the device IDs of the network devices according to the response messages of the network devices. In the aforementioned embodiment, an automatic configuration function is achieved, and regardless of adding, removing or replacing any device in the control network, automatic adjustment can be performed without manual adjustment and setting.

In summary, the system and method for controlling the power line network of the aforementioned embodiment can be applied in various control networks taking the power line as a medium, for example, a home power line control network such as a light control system or a digital appliance system, etc, but not limited to the aforementioned examples. The system and method for controlling the power line network of the aforementioned embodiment can also be applied in power line control networks of plants or office buildings, or power line local networks of small offices, but not limited to the aforementioned examples. The disclosure can be used to resolve a duplicated/conflicting ID and the network demarcation of the control networks in the increasingly popularised system for controlling the power line network, and can achieve the automatic configuration function to satisfy application demands such as remote control, etc.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A system for controlling a power line network, comprising:
   a control unit device, generating a first temporary identification (ID), and broadcasting a first query message in the power line network, wherein the first query message comprises the first temporary ID; when the control unit device does not receive a response/warning message corresponding to the first query message within a predetermined time, the control unit device sets a control network identification (CNID) of the control unit device to the first temporary ID; when the control unit device receives the response/warning message corresponding to the first query message within the predetermined time, the control unit device generates a second temporary ID, and broadcasts a second query message in the power line network, wherein the second query message comprises the second temporary ID, and the second temporary ID is different to the first temporary ID;
   an agent device, wherein the control unit device coordinates the agent device so that the agent device and the control unit device synchronously broadcast a plurality of discovery messages in the power line network, and each of the discovery messages comprises a CNID of the device sending the discovery message; and
   one or more network devices, receiving all of the discovery messages from the power line network, and setting the CNID of the discovery message with the strongest received signal strength as a CNID of the one or more network devices.

2. The system for controlling the power line network as claimed in claim 1, wherein the first temporary ID is generated according to a device ID of the control unit device, a first random number and a first predetermined function, and the second temporary ID is generated according to the device ID of the control unit device, a second random number and a second predetermined function.

3. The system for controlling the power line network as claimed in claim 1, wherein when the control unit device does not receive the response/warning message corresponding to the first query message within the predetermined time, the control unit device sets both CNIDs of the control unit device and the agent device to the first temporary ID.

4. The system for controlling the power line network as claimed in claim 1, wherein the control unit device receives a third query message from the power line network, and when a third temporary ID contained in the third query message is the same as the CNID of the control unit device, the control unit device sends a response/warning message corresponding to the third query message to the power line network.

5. The system for controlling the power line network as claimed in claim 1, wherein the power line network comprises a plurality of control networks; the agent device, the control unit device and the one or more network devices are all located in one of the control networks; among the agent device, the control unit device and the one or more network devices, the agent device is closest to the other control networks.

6. The system for controlling the power line network as claimed in claim 1, wherein the control unit device coordinates the agent device according to a predetermined cycle so that the agent device and the control unit device synchronously broadcast the discovery messages in the power line network.

7. The system for controlling the power line network as claimed in claim 1, wherein the one or more network devices send a request message to the power line network, and the control unit device coordinates the agent device in response to the request message so that the agent device and the control unit device synchronously broadcast the discovery messages in the power line network.

8. The system for controlling the power line network as claimed in claim 1, wherein except the discovery messages, the one or more network devices only receive and process messages having the CNID of the one or more network devices.

9. The system for controlling the power line network as claimed in claim 1, wherein the one or more network devices send a response message to the power line network in response to the discovery message of the control unit device, wherein the response message comprises a device ID of the one or more network devices, and the control unit device receives the response message and records the device ID.

10. A method for controlling a power line network, comprising:
    a control unit device generating a first temporary identification (ID);
    the control unit device broadcasting a first query message in the power line network, wherein the first query message comprises the first temporary ID;
    setting a control network identification (CNID) of the control unit device to the first temporary ID when the control unit device does not receive a response/warning message corresponding to the first query message within a predetermined time;
    generating a second temporary ID when the control unit device receives the response/warning message corresponding to the first query message within the predetermined time, and broadcasting a second query message in the power line network, wherein the second query message comprises the second temporary ID, and the second temporary ID is different to the first temporary ID;

the control unit device coordinating an agent device so that the agent device and the control unit device synchronously broadcasting a plurality of discovery messages in the power line network, wherein each of the discovery messages comprises a CNID of the device sending the discovery message; and one or more network devices receiving all of the discovery messages from the power line network, and setting the CNID of the discovery message with the strongest received signal strength as a CNID of the one or more network devices.

11. The method for controlling the power line network as claimed in claim 10, wherein the first temporary ID is generated according to a device ID of the control unit device, a first random number and a first predetermined function, and the second temporary ID is generated according to the device ID of the control unit device, a second random number and a second predetermined function.

12. The method for controlling the power line network as claimed in claim 10, further comprising:

setting both CNIDs of the control unit device and the agent device to the first temporary ID when the response/warning message corresponding to the first query message is not received within the predetermined time.

13. The method for controlling the power line network as claimed in claim 10, further comprising:

receiving a third query message from the power line network; and sending a response/warning message corresponding to the third query message to the power line network when a third temporary ID contained in the third query message is the same as the CNID of the control unit device.

14. The method for controlling the power line network as claimed in claim 10, wherein the power line network comprises a plurality of control networks; the agent device, the control unit device and the one or more network devices are all located in one of the control networks; among the agent device, the control unit device and the one or more network devices, the agent device is closest to the other control networks.

15. The method for controlling the power line network as claimed in claim 10, wherein the control unit device coordinates the agent device according to a predetermined cycle so that the agent device and the control unit device synchronously broadcast the discovery messages in the power line network.

16. The method for controlling the power line network as claimed in claim 10, wherein the one or more network devices send a request message to the power line network, and the control unit device coordinates the agent device in response to the request message so that the agent device and the control unit device synchronously broadcast the discovery messages in the power line network.

17. The method for controlling the power line network as claimed in claim 10, wherein except the discovery messages, the one or more network devices only receive and process messages having the CNID of the one or more network devices.

18. The method for controlling the power line network as claimed in claim 10, further comprising:

the one or more network devices sending a response message to the power line network in response to the discovery message of the control unit device, wherein the response message comprises a device ID of the one or more network devices; and the control unit device receiving the response message and recording the device ID.

* * * * *